(12) United States Patent
Hirata et al.

(10) Patent No.: US 11,358,591 B2
(45) Date of Patent: Jun. 14, 2022

(54) PARKING ASSIST APPARATUS

(71) Applicant: AISIN CORPORATION, Kariya (JP)

(72) Inventors: Hironori Hirata, Anjo (JP); Masahiro Ishihara, Nishio (JP)

(73) Assignee: AISIN CORPORATION, Kariya (JP)

( * ) Notice: Subject to any disclaimer, the term of this patent is extended or adjusted under 35 U.S.C. 154(b) by 235 days.

(21) Appl. No.: 16/607,452

(22) PCT Filed: Feb. 22, 2018

(86) PCT No.: PCT/JP2018/006482
§ 371 (c)(1),
(2) Date: Oct. 23, 2019

(87) PCT Pub. No.: WO2018/198506
PCT Pub. Date: Nov. 1, 2018

(65) Prior Publication Data
US 2020/0130675 A1    Apr. 30, 2020

(30) Foreign Application Priority Data
Apr. 27, 2017  (JP) .............................. JP2017-088828

(51) Int. Cl.
*B60W 30/06*         (2006.01)
(52) U.S. Cl.
CPC ......... *B60W 30/06* (2013.01); *B60W 2400/00* (2013.01)
(58) Field of Classification Search
CPC ...................................................... B60W 30/06
(Continued)

(56) References Cited

U.S. PATENT DOCUMENTS

2015/0025732 A1* 1/2015 Min .................. B62D 15/0285
701/23
2017/0032681 A1* 2/2017 Tomozawa ............. G08G 1/168
(Continued)

FOREIGN PATENT DOCUMENTS

| JP | 10-230862 A | 9/1998 |
| JP | 2010-269707 A | 12/2010 |
| JP | 2012-131460 A | 7/2012 |

OTHER PUBLICATIONS

International Search Report for PCT/JP2018/006482, dated May 15, 2018.

*Primary Examiner* — Peter D Nolan
*Assistant Examiner* — Luke Huynh
(74) *Attorney, Agent, or Firm* — Sughrue Mion, PLLC

(57) ABSTRACT

A parking assist apparatus according to an embodiment includes a memory and a hardware processor coupled to the memory. The hardware processor: sets a first circumference being in contact with a first straight line extending in a traveling direction of a vehicle and passing through a position of the vehicle; sets a second circumference being in contact with a second straight line extending in an exit direction from a parking target area of the vehicle and passing through the parking target area; sets a third circumference obtained by shifting the second circumference along the second straight line until the second circumference comes in contact with the first circumference; acquires a guidance route including part of the first circumference as a route for moving the vehicle forward and part of the third circumference as a route for moving the vehicle backward; and guides the vehicle along the acquired guidance route.

10 Claims, 10 Drawing Sheets

(58) Field of Classification Search
USPC .......................................................... 701/25
See application file for complete search history.

(56) References Cited

U.S. PATENT DOCUMENTS

2017/0096167 A1* 4/2017 Yoon .................... B62D 15/028
2018/0297589 A1* 10/2018 Hasejima ............. B62D 15/027

* cited by examiner

PARKING ASSIST APPARATUS

CROSS-REFERENCE TO RELATED APPLICATIONS

This application is national stage application of International Application No. PCT/JP2018/006482, filed Feb. 22, 2018, claiming priority based on Japanese Patent Application No. 2017-088828 filed Apr. 27, 2017, which designates the United States, incorporated herein by reference.

TECHNICAL FIELD

The present invention relates to a parking assist apparatus.

BACKGROUND ART

Conventionally, there has been known a parking assist apparatus that acquires a route leading to a parking target area and guides a vehicle along the acquired route.

CITATION LIST

Patent Literature

Patent Literature 1: Japanese Patent Application Laid-open No. 2010-269707

SUMMARY OF INVENTION

Problem to be Solved by the Invention

In relation to the parking assist apparatus, there is a case where it is desired to suppress calculation cost required for acquiring the route.

Means for Solving Problem

A parking assist apparatus according to an embodiment of the present invention includes a memory and a hardware processor coupled to the memory. The hardware processor is configured to: set a first circumference that is in contact with a first straight line extending in a traveling direction of a vehicle and that passes through a position of the vehicle; set a second circumference that is in contact with a second straight line extending in an exit direction from a parking target area of the vehicle and that passes through the parking target area; set a third circumference obtained by shifting the second circumference along the second straight line until the second circumference comes in contact with the first circumference; and acquire a guidance route that includes part of the first circumference as a route for moving the vehicle forward and includes part of the third circumference as a route for moving the vehicle backward; and guide the vehicle along the acquired guidance route.

Thus, the guidance route is determined by setting the first circumference and the second circumference, so that calculation cost required for acquiring the route is suppressed.

In the parking assist apparatus, the hardware processor: extracts, from among a plurality of first combinations of a fifth circumference and a seventh circumference, a second combination in which the fifth circumference and the seventh circumference are contactable with each other by shift of the seventh circumference along the second straight line, the fifth circumference being one of a plurality of fourth circumferences each being in contact with the first straight line, each passing through the position of the vehicle, and each having different radii, the seventh circumference being one of a plurality of sixth circumferences each being in contact with the second straight line, each passing through the parking target area, and each having different radii; sets the fifth circumference constituting the second combination as the first circumference; and sets the seventh circumference constituting the second combination as the second circumference.

Thus, the number of first combinations to be examined is the product of the number of fourth circumferences and the number of sixth circumferences at maximum, so that the calculation cost required for acquiring the route is suppressed.

In the parking assist apparatus, when a plurality of the second combinations are extracted, the hardware processor selects, from the extracted second combinations, the second combination in which a shift amount of the seventh circumference is minimum.

Thus, when an obstacle exists at a position facing the parking target area, it is possible to reduce a risk that the vehicle collides with the obstacle.

In the parking assist apparatus, when a plurality of second combinations are extracted, the hardware processor selects, from the extracted second combinations, the second combination in which a shift amount of the seventh circumference is maximum.

Thus, when an obstacle exists at a position adjacent to the parking target area, it is possible to reduce a risk of involving the obstacle at the time of retreat.

In the parking assist apparatus, the hardware processor determines sequentially whether each of the plurality of first combinations corresponds to the second combination and selects the first combination that is initially determined to correspond to the second combination.

Thus, there arises a case where it is possible to set the first circumference and the second circumference without examining all combinations of the number of the product of the number of fourth circumferences and the number of sixth circumferences, so that the calculation cost required for acquiring the route is further suppressed.

BRIEF DESCRIPTION OF DRAWINGS

FIG. 1 is an exemplary perspective view illustrating a state in which part of a passenger compartment of a vehicle of a first embodiment is seen through;

DESCRIPTION OF EMBODIMENTS

Figure 1:
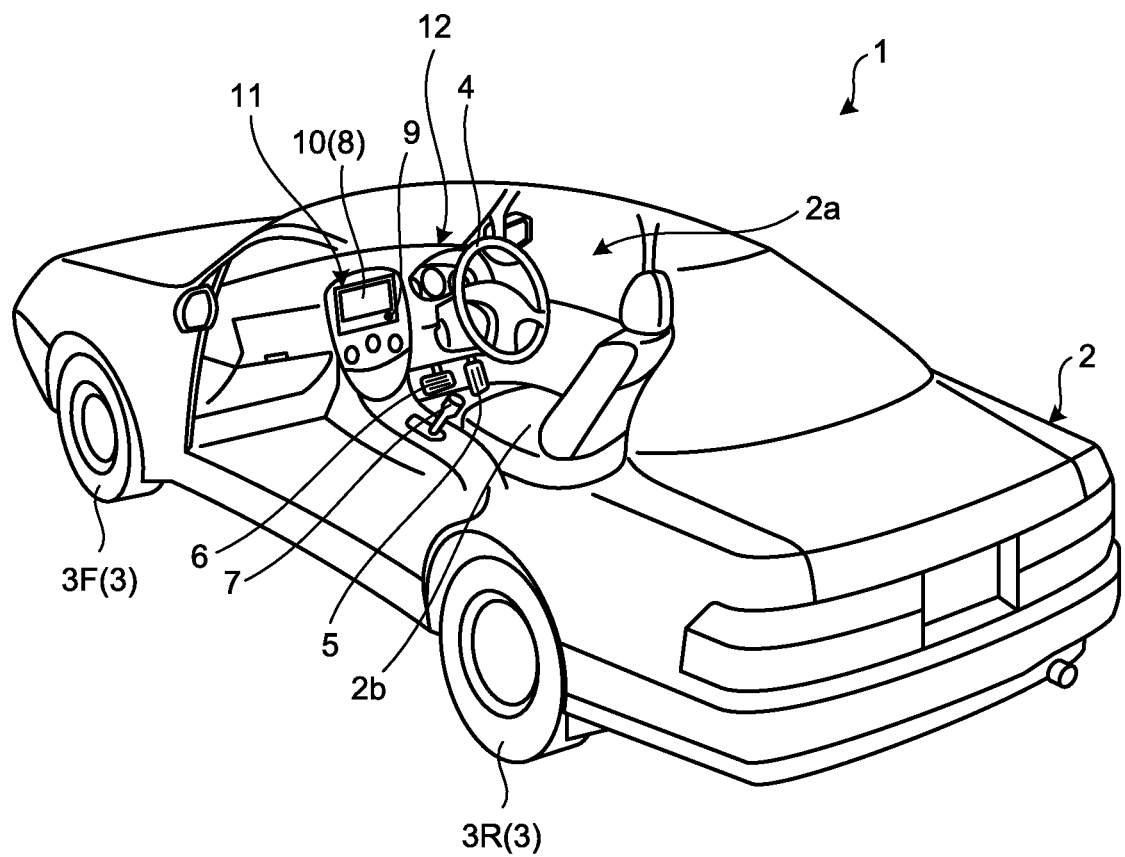

The following exemplary embodiments and modification examples include similar components. Thus, in the following, similar components are denoted by common reference characters and numerals and a redundant description is partially omitted. The parts included in the embodiments and modification examples can be replaced with corresponding parts of other embodiments and modification examples. Furthermore, configurations, positions, and the like of the parts included in the embodiments and modification examples are similar to those of the other embodiments and modification examples unless otherwise specified.

First Embodiment

A vehicle 1 of the first embodiment may be, for example, a vehicle using an internal combustion engine (not illustrated) as a driving source, that is, an internal combustion engine vehicle, a vehicle using an electric motor (not illustrated) as a driving source, that is, an electric vehicle, a fuel cell vehicle, and the like, a hybrid vehicle using both of them as a driving source, or a vehicle provided with other driving sources. Furthermore, the vehicle 1 can be mounted with various transmissions or various devices necessary for driving the internal combustion engine or the electric motor, for example, system, parts, and the like. Furthermore, it is possible to variously set the method, number, layout, and the like of devices related to the driving of wheels 3 in the vehicle 1.

FIG. 1 is an exemplary perspective view illustrating a state in which part of a passenger compartment of the vehicle of the first embodiment is seen through.

As illustrated in FIG. 1, a vehicle body 2 constitutes a passenger compartment 2a in which an occupant (not illustrated) gets. The passenger compartment 2a is provided therein with a steering unit 4, an acceleration operation unit 5, a brake operation unit 6, a gear shift operation unit 7, and the like in a state of facing a seat 2b of a driver as an occupant.

The steering unit 4 is, for example, a steering wheel protruding from a dashboard 12, the acceleration operation unit 5 is, for example, an accelerator pedal located under the driver's foot, the brake operation unit 6 is, for example, a brake pedal located under the driver's foot, and the gear shift operation unit 7 is, for example, a shift lever protruding from a center console. The steering unit 4, the acceleration operation unit 5, the brake operation unit 6, and the gear shift operation unit 7 are not limited thereto.

The passenger compartment 2a is also provided with a display screen 8 and a voice output device 9. The display screen 8 is, for example, a liquid crystal display (LCD), an organic electroluminescent display (OELD), and the like. The voice output device 9 is, for example, a speaker. Furthermore, the display screen 8 is, for example, covered with a transparent operation input unit 10 such as a touch panel. The occupant can visually recognize an image displayed on the display screen 8 via the operation input unit 10. Furthermore, the occupant can perform operation input by touching, pushing, or moving the operation input unit 10 with a finger and the like at a position corresponding to the image displayed on the display screen of the display screen 8.

The display screen 8, the voice output device 9, the operation input unit 10, and the like are, for example, provided in a monitor device 11 located at a center of the dashboard 12 in a vehicle width direction, that is, a right-and-left direction. The monitor device 11 can be provided with an operation input unit (not illustrated) such as a switch, a dial, a joystick, and a push button.

In addition, another display screen different from the display screen 8 may be provided at an arbitrary position (for example, an instrument panel part of the dashboard 12).

Furthermore, as illustrated in FIG. 1, the vehicle 1 is, for example, a four-wheeled vehicle and includes two front wheels 3F on the right and left sides and two rear wheels 3R on the right and left sides. Each of these four wheels 3 can be configured to be steerable.

Figure 2:
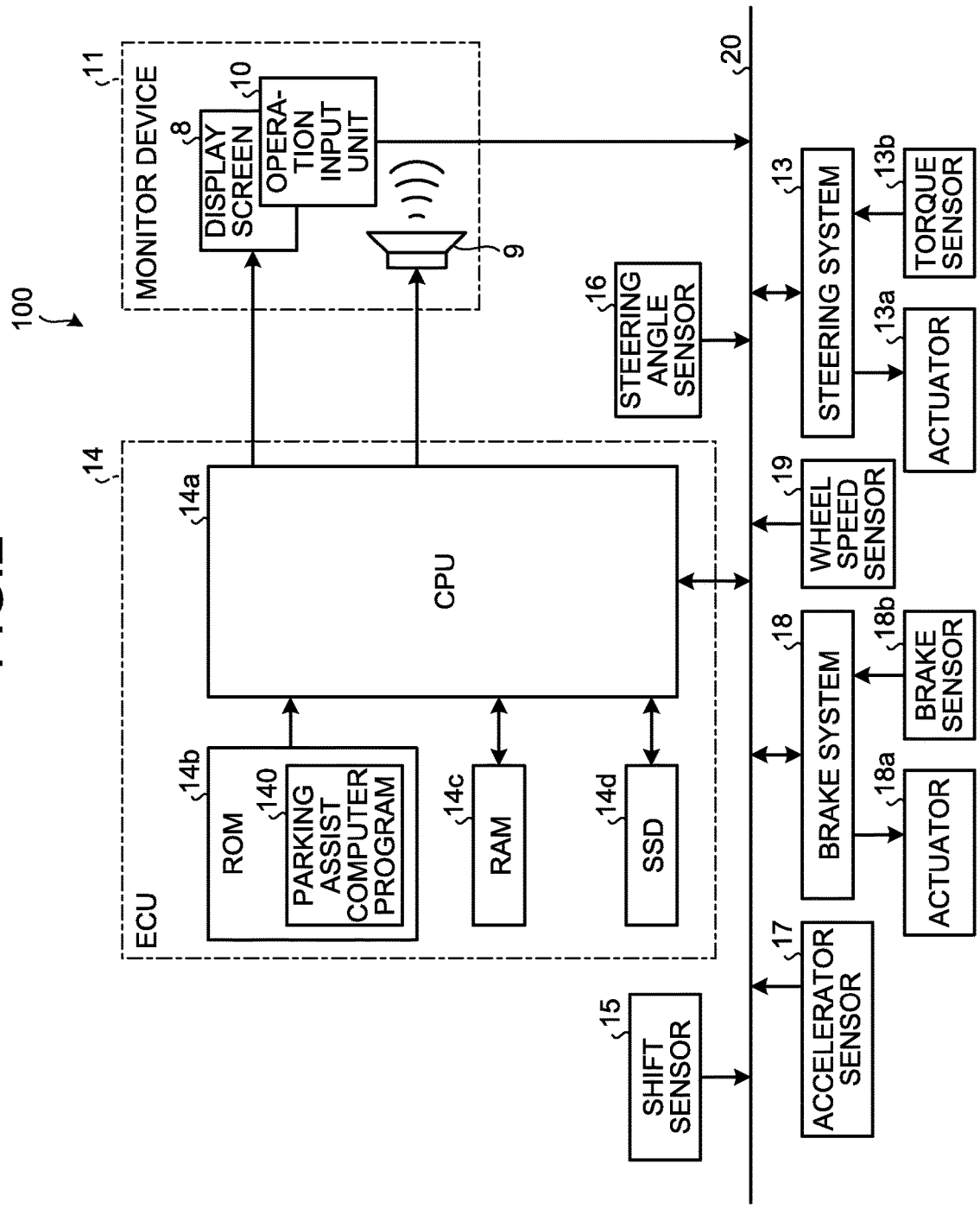
FIG. 2 is an exemplary block diagram of a configuration of a parking assist system of the first embodiment.

FIG. 2 is an exemplary block diagram of a configuration of a parking assist system of the first embodiment. As illustrated in FIG. 2, the vehicle 1 includes a steering system 13 that steers at least two wheels 3. The steering system 13 includes an actuator 13a and a torque sensor 13b. The steering system 13 is electrically controlled by an ECU 14 and the like to operate the actuator 13a. The steering system 13 is, for example, an electric power steering system, a steer by wire (SBW) system, and the like. The steering system 13 applies torque, that is, assist torque, to the steering unit 4 by the actuator 13a, thereby supplementing steering force or steers the wheels 3 by the actuator 13a. In such a case, the actuator 13a may steer one wheel 3 or a plurality of wheels 3. Furthermore, the torque sensor 13b detects, for example, torque applied to the steering unit 4 by a driver.

Furthermore, as illustrated in FIG. 2, in a parking assist system 100, in addition to the monitor device 11, the steering system 13, the ECU 14, and the like, a shift sensor 15, a steering angle sensor 16, an accelerator sensor 17, a brake system 18, a wheel speed sensor 19, and the like are electrically connected via an in-vehicle network 20 as an electric communication line.

The in-vehicle network 20 is configured as, for example, a controller area network (CAN). The ECU 14 can control the steering system 13, the brake system 18, and the like by sending a control signal through the in-vehicle network 20. Furthermore, the ECU 14 can receive detection results of the torque sensor 13b, the shift sensor 15, the steering angle sensor 16, the accelerator sensor 17, a brake sensor 18b, the wheel speed sensor 19, and the like, and operation signals of the operation input unit 10 and the like via the in-vehicle network 20.

The shift sensor 15 is, for example, a sensor that detects the position of a movable part of the gear shift operation unit 7. The shift sensor 15 can detect the positions of a lever, an arm, a button, and the like as the movable part of the gear shift operation unit 7. The shift sensor 15 may include a displacement sensor or may be configured as a switch.

The steering angle sensor 16 is, for example, a sensor that detects the steering amount of the steering unit 4 such as a steering wheel. The steering angle sensor 16 is configured by using, for example, a Hall element and the like. The ECU 14 acquires the steering amount of the steering unit 4 by the driver, the steering amount of each wheel 3 during automatic steering from the steering angle sensor 16, and performs various types of control. In addition, the steering angle sensor 16 detects the rotation angle of a rotating part included in the steering unit 4. The steering angle sensor 16 is an example of an angle sensor.

The accelerator sensor 17 is, for example, a sensor that detects the position of a movable part of the acceleration operation unit 5. The accelerator sensor 17 can detect the position of an accelerator pedal as the movable part. The accelerator sensor 17 includes a displacement sensor.

The brake system 18 is, for example, an anti-lock brake system (ABS) that suppresses locking of the brake, a side slip preventing device (ESC: electronic stability control) that suppresses side slop of the vehicle 1 during cornering, an electric brake system that increases brake force (performs brake assist), a brake by wire (BBW), and the like. The brake system 18 applies braking force to the wheels 3 and thus to the vehicle 1 via an actuator 18a. The brake sensor 18b is, for example, a sensor that detects the position of a movable part of the brake operation unit 6. The brake sensor 18b can detect the position of a brake pedal as the movable part of the brake operation unit 6. The brake sensor 18b includes a displacement sensor.

The wheel speed sensor 19 is, for example, a sensor that detects the number of rotations of the wheel 3 per unit time. The wheel speed sensor 19 outputs a wheel speed pulse number indicating the detected number of rotations as a sensor value. The wheel speed sensor 19 can be configured by using, for example, a Hall element and the like. The ECU 14 calculates a shift amount and the like of the vehicle 1 on the basis of the sensor value acquired from the wheel speed sensor 19, and performs various types of control.

The ECU 14 is an example of a parking assist apparatus. The ECU 14 includes, for example, a central processing unit (CPU) 14a, a read only memory (ROM) 14b, a random access memory (RAM) 14c, a solid state drive (SSD, a flash memory) 14d, and the like. The CPU 14a is an arithmetic device capable of executing computer programs. The ROM 14b, the RAM 14c, and the SSD 14d are storage devices capable of storing computer programs and data. That is, the ECU 14 has a hardware configuration similar to that of a computer.

The CPU 14a can perform various types of arithmetic processing and control such as image processing related to the image displayed on the display screen 8 and the control of the vehicle 1. Particularly, the CPU 14a performs a function as the parking assist apparatus by executing a parking assist computer program 140 installed and stored in the ROM 14b.

The RAM 14c temporarily stores various types of data used in computations in the CPU 14a. The SSD 14d is a rewritable nonvolatile storage device and can store data even though the ECU 14 is powered off. The CPU 14a, the ROM 14b, the RAM 14c, and the like can be integrated in a single package. Furthermore, the ECU 14 may have a configuration in which another logic operation processor such as a digital signal processor (DSP), a logic circuit, and the like are used instead of the CPU 14a. Furthermore, instead of the SSD 14d, a hard disk drive (HDD) may also be provided, or the SSD 14d or the HDD may also be provided separately from the ECU 14.

The parking assist computer program 140 may also be installed in the SSD 14d instead of the ROM 14b. The parking assist computer program 140 may be provided by being recorded on a computer-readable recording medium, such as a CD-ROM, a flexible disk (FD), a CD-R, a digital versatile disc (DVD), and a flash memory, in a file format installable or executable in a computer.

Furthermore, the parking assist computer program 140 may be configured to be provided by being stored on a computer connected to a network such as the Internet and downloaded via the network. Furthermore, the parking assist computer program 140 may be provided or distributed via the network such as the Internet.

It is noted that the configuration, arrangement, electrical connection form, and the like of the aforementioned various sensors or actuators are merely examples and can be variously modified.

Figure 3:
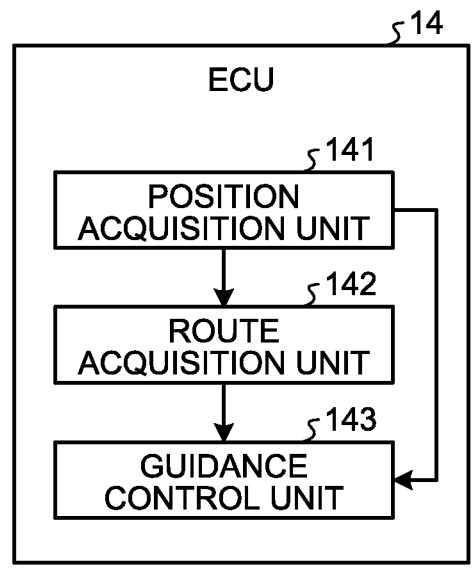
FIG. 3 is a block diagram illustrating a functional configuration of an ECU as the parking assist apparatus of the first embodiment.

FIG. 3 is a block diagram illustrating a functional configuration of the ECU 14 as the parking assist apparatus of the first embodiment. The ECU 14 serves as a position acquisition unit 141, a route acquisition unit 142, and a guidance control unit 143. The CPU 14a reads out and executes the parking assist computer program 140 from the ROM 14b, thereby performing functions as the position acquisition unit 141, the route acquisition unit 142, and the guidance control unit 143. It is noted that some or all the position acquisition unit 141, the route acquisition unit 142, and the guidance control unit 143 may also be configured by a hardware circuit.

Figure 4:
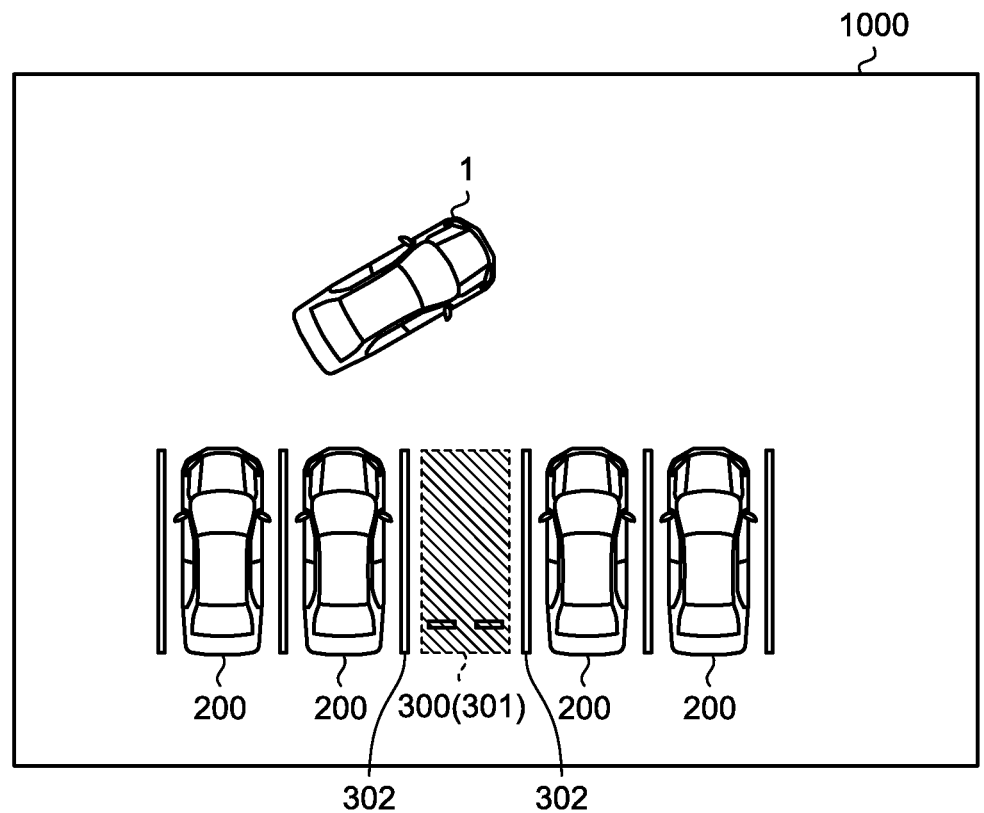
FIG. 4 is a view illustrating an example of an environment in which a vehicle of the first embodiment is parked.

The position acquisition unit 141 detects, at the time of start of a parking assist mode, an area where the vehicle 1 is parked (a parking target area 301) and acquires a position of the area. For example, as illustrated in FIG. 4, when the vehicle 1 is traveling forward in a parking lot 1000, the position acquisition unit 141 detects a possible parking area 300 as the parking target area 301, which is located on the right side in the traveling direction of the vehicle 1 and where the other vehicle 200 is not parked, and acquires a position of the parking target area 301.

It is noted that the method for detecting the parking target area 301 and acquiring the position of the detected parking target area 301 is not limited to a specific method. The position acquisition unit 141 can detect the parking target area 301 and acquire the position of the detected parking target area 301 by an existing method or an arbitrary method to be developed hereafter.

In one example, when an imaging unit that captures a surrounding environment outside the vehicle is provided in the vehicle body 2 and the position acquisition unit 141 sequentially acquires captured image data output by the imaging unit and division lines 302 of the possible parking area 300 indicated on a road surface are reflected on the acquired captured image data, the position acquisition unit 141 detects the division lines 302 by image recognition. Then, the position acquisition unit 141 specifies an area divided by the detected division lines 302 as the parking target area 301. On the basis of the direction of an optical axis, the angle of view, and the installation position of the imaging unit and a position where the division lines 302 are reflected on the captured image data, the position acquisition unit 141 calculates a positional relation between the vehicle 1 and the parking target area 301 in a three-dimensional space.

In another example, a distance measuring device is provided in the vehicle body 2 to detect a distance to an obstacle outside the vehicle and a direction in which the obstacle exists and the position acquisition unit 141 sequentially acquires output data from the distance measuring device. The distance measuring device is, for example, sonar, a laser range scanner, a stereo camera, and the like. According to the example of FIG. 4, the position acquisition unit 141 detects the parking target area 301 by detecting, by the distance measuring device, a distance corresponding to the other vehicle 200 on the right side surface of the vehicle 1 for a predetermined period or more while the vehicle 1 is traveling in the parking lot 1000. Thereafter, when no obstacle is detected on the right side surface of the vehicle 1 for a period equal to or more than a length corresponding to a minimum width necessary for an area where the vehicle 1 can be parked (including a case where a distance to the obstacle is equal to or more than a length in the vehicle front-and-rear direction necessary for parking the vehicle 1, that is, the total length), the position acquisition unit 141 detects the area with no detected obstacle as the parking target area 301. On the basis of the installation position and the installation direction of the distance measuring device and the detected distance and direction, the position acquisition unit 141 calculates the positional relation between the vehicle 1 and the parking target area 301 in the three-dimensional space.

In the following description, the position of the vehicle 1 at the time of start of the parking assist mode is denoted as an initial position.

Moreover, the position acquisition unit 141 acquires the current position of the vehicle 1 in substantially real-time during the execution of the parking assist mode. The method for acquiring the current position of the vehicle 1 is not limited to a specific method. In one example, the position acquisition unit 141 sequentially acquires detection data of the wheel speed sensor 19 and calculates the current position of the vehicle 1 by wheel odometry using the acquired detection data. In another example, when the vehicle 1 is provided with a global positioning system (GPS), the position acquisition unit 141 acquires the current position by using the GPS. In further another example, when the vehicle body 2 is provided with the imaging unit that captures the surrounding environment, the position acquisition unit 141 generates an optical flow by using captured image data sequentially output from the imaging unit, and calculates the current position of the vehicle 1 on the basis of the generated optical flow.

The reference (the origin) for expressing the current position of the vehicle 1 is not limited to a specific position. The position acquisition unit 141 may express the current position of the vehicle 1 as a relative position from the initial position, or express the current position of the vehicle 1 as a relative position from a position included in the parking target area 301 (in one example, a parking target position 104 illustrated in FIG. 5 and FIG. 6 to be described below).

The route acquisition unit 142 acquires a route from the initial position of the vehicle 1 to the parking target area 301 detected by the position acquisition unit 141, that is, a guidance route. The acquisition of the guidance route corresponds to generation of the guidance route by selecting circumferences and combining the circumferences. The selection of the circumferences includes selecting one circumference from a plurality of circumference candidates. The selection of the circumferences includes determining circumferences by an arbitrary method.

Figure 5:
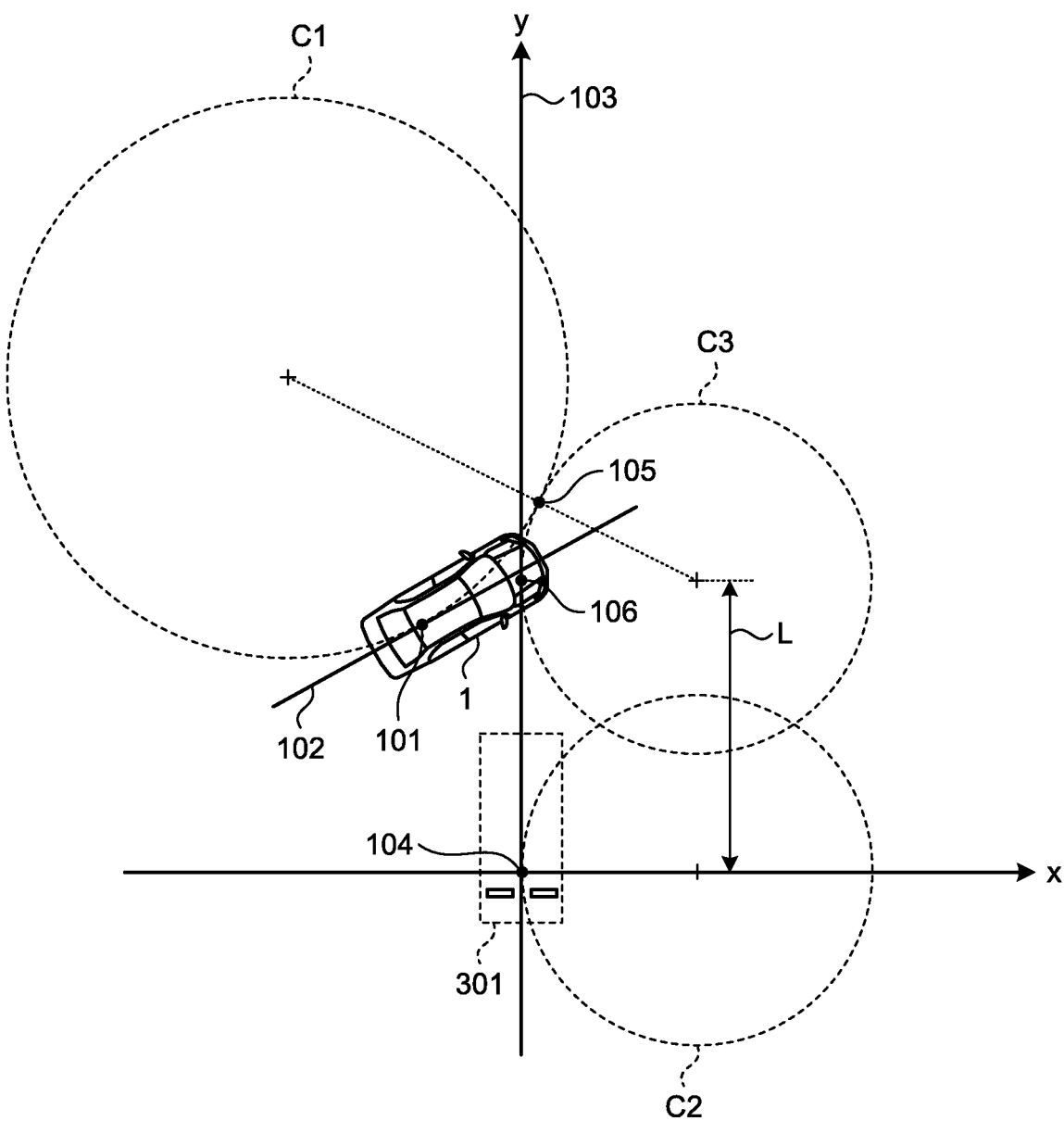
FIG. 5 is a view for explaining a guidance route acquisition algorithm of the first embodiment.
Figure 7:
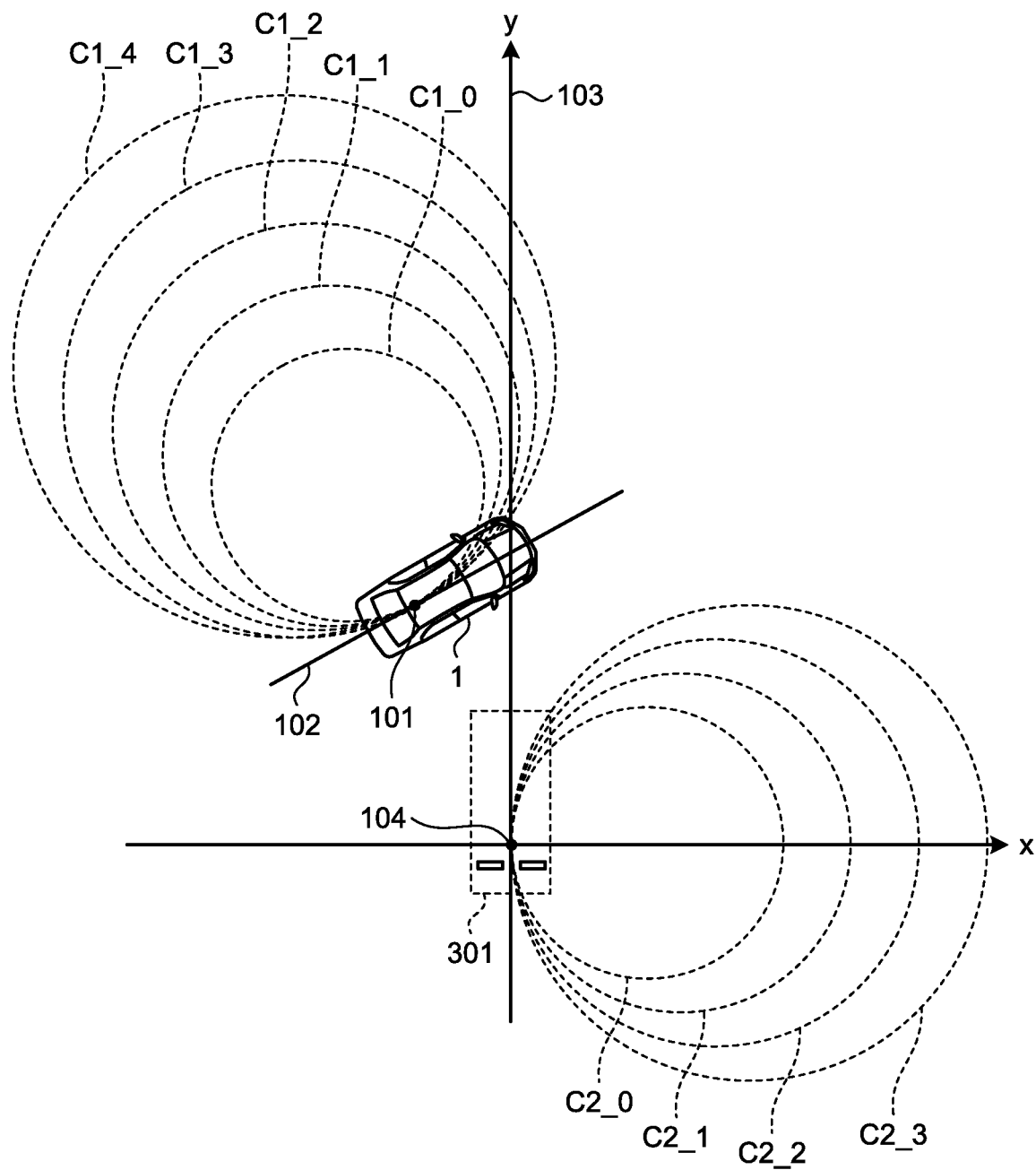
FIG. 7 is a view for explaining the guidance route acquisition algorithm of the first embodiment.

FIG. 5 and FIG. 7 are views for explaining a guidance route acquisition algorithm of the first embodiment.

The route acquisition unit 142 sets a first circumference C1 that passes through an initial position 101 and that is in contact with a first straight line 102 extending in the traveling direction of the vehicle 1. While the center position of a rear wheel shaft of the vehicle 1 is handled as the position of the vehicle 1, the handling of the position of the vehicle 1 is not limited thereto. For example, the position of the center of gravity of the vehicle 1 may also be handled as the position of the vehicle 1.

Subsequently, the route acquisition unit 142 sets a second circumference C2 that is in contact with a second straight line 103 extending in an exit direction from the parking target area 301 and that passes through the parking target area 301. In the example of FIG. 5, the passage through the parking target area 301 corresponds to passage through the parking target position 104 of the vehicle 1 in the parking target area 301, that is, the center position of the rear wheel shaft of the vehicle 1 when the vehicle 1 has been parked.

Hereinafter, a description will be given by using a coordinate system in which the second straight line 103 is set as a y axis and a straight line that passes through the parking target position 104 and is perpendicular to the y axis is set as an x axis as illustrated in FIG. 5. The exit direction of the vehicle 1 is assumed to be the positive direction of the y axis.

Subsequently, the route acquisition unit 142 sets a third circumference C3 obtained by shifting the second circumference C2 in the positive direction of the y axis until it comes in contact with the first circumference C1. As illustrated in FIG. 5, the first circumference C1 and the third circumference C3 come in contact with each other at a position 105.

The third circumference C3 is in contact with the y axis, which is the second straight line 103, at a position 106. When a distance between the second circumference C2 and the third circumference C3, that is, a shift amount of the second circumference C2 is denoted as a shift amount L, coordinates of the position 106 is denoted by (0, L).

Figure 6:
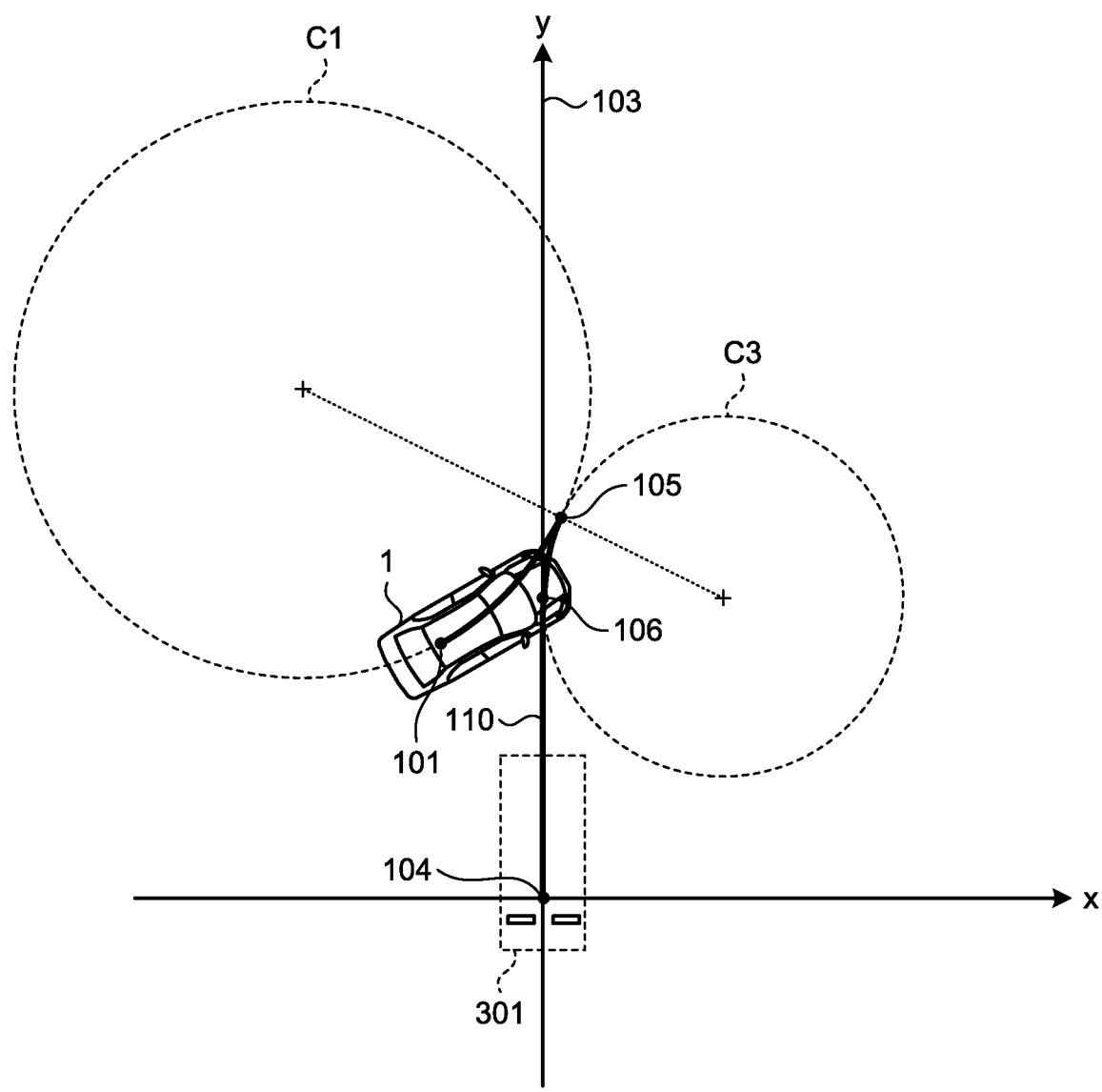
FIG. 6 is a view for explaining the guidance route acquisition algorithm of the first embodiment.

Subsequently, as illustrated in FIG. 6, the route acquisition unit 142 generates, as a guidance route 110, a route that causes the vehicle 1 to move forward from the initial position 101 to the position 105 along the first circumference C1, move backward from the position 105 to the position 106, which is the contact point between the third circumference C3 and the y axis, along the third circumference C3, and move backward from the position 106 to the parking target position 104 along the y axis.

As long as the guidance route 110 includes part of the first circumference C1 as a route for moving the vehicle 1 forward and includes part of the third circumference C3 as a route for moving the vehicle 1 backward, various modifications are possible. For example, the position 105 and the position 106 illustrated in FIG. 5 and FIG. 6 are connection parts of two figures having different curvatures and steering angles suddenly change when the vehicle 1 passes through the position 105 and the position 106. The route acquisition unit 142 may allow a change in the steering angles to be smooth by, for example, inserting a cycloid-shaped route into such connection parts.

According to the aforementioned acquisition algorithm, when a radius of the first circumference C1 and a radius of the second circumference C2 are determined, the guidance route 110 is determined. Since the number of parameters to be determined is small, it is possible to acquire the guidance route 110 at a low calculation cost.

The algorithm for determining the radius of the first circumference C1 and the radius of the second circumference C2 is not limited to a specific algorithm. The route acquisition unit 142 can determine the radius of the first circumference C1 and the radius of the second circumference C2 by using an arbitrary function, numerical expression, or table. Here, as an example, it is assumed that the route acquisition unit 142 sets the first circumference C1 from a plurality of first circumference candidates having different radii and sets the second circumference C2 from a plurality of second circumference candidates having different radii.

For example, as illustrated in FIG. 7, the route acquisition unit 142 sets five first circumference candidates C_0 to C1_4 as the first circumference candidates. The radii of the first circumference candidates C1_0 to C1_4 are set in advance. All the first circumference candidates C1_0 to C_4 are in contact with the first straight line 102 and pass through the initial position 101. Furthermore, the route acquisition unit 142 sets four second circumference candidates C2_0 to C2_3 as the second circumference candidates. The radii of the second circumference candidates C2_0 to C2_3 are set in advance. All the second circumference candidates C2_0 to C2_3 are in contact with the second straight line 103 and pass through the parking target position 104. The route acquisition unit 142 selects combinations of the first circumference C1 and the second circumference C2 from a plurality of, that is, 20 combinations including one of the five first circumference candidates C1_0 to C1_4 and one of the four second circumference candidates C2_0 to C2_3. As described above, since the number of combinations to be examined is small, calculation cost for acquiring the guidance route 110 is suppressed. The number of the first circumference candidates and the number of the second circumference candidates are not limited to the aforementioned numbers.

The guidance control unit 143 guides the vehicle 1 to move along the guidance route 110 on the basis of a comparison between the current position of the vehicle 1 acquired by the position acquisition unit 141 and the guidance route acquired by the route acquisition unit 142.

The guidance method performed by the guidance control unit 143 is not limited to a specific method. In one example, the guidance control unit 143 notifies the driver of a traveling direction, start, braking, a change in the range of the gear shift operation unit 7, and the like by display on the display screen 8 or voice output from the voice output device 9. The driver can operate the steering unit 4, the acceleration operation unit 5, the brake operation unit 6, and the gear shift operation unit 7 according to the notification. In addition, when the vehicle 1 moves forward or backward, the driver can also use creeping, in which driving force of the engine is transmitted, without operating the acceleration operation unit 5.

In another example, the guidance control unit 143 performs automatic steering. Specifically, the guidance control unit 143 steers the wheels 3 such that the vehicle 1 travels along the guidance route 110 by giving an instruction to the actuator 13a of the steering system 13. The driver does not need to operate the steering unit 4. The guidance control unit 143 notifies the driver of start, braking, a change in the range of the gear shift operation unit 7, and the like by display on the display screen 8 or voice output from the voice output device 9.

In further another example, the guidance control unit 143 automatically performs brake and a change in the range as well as the automatic steering. For example, when the vehicle 1 approaches a turnabout position (the position 105 of FIGS. 5 and 6) or the parking target position 104 on the guidance route 110, the guidance control unit 143 performs a brake operation of the vehicle 1 by sending an instruction to the actuator 18a. Furthermore, when the vehicle 1 has reached the turnabout position, the guidance control unit 143 automatically changes the range.

Hereinafter, a description will be given on the assumption that the guidance control unit 143 performs the automatic steering.

Figure 8:
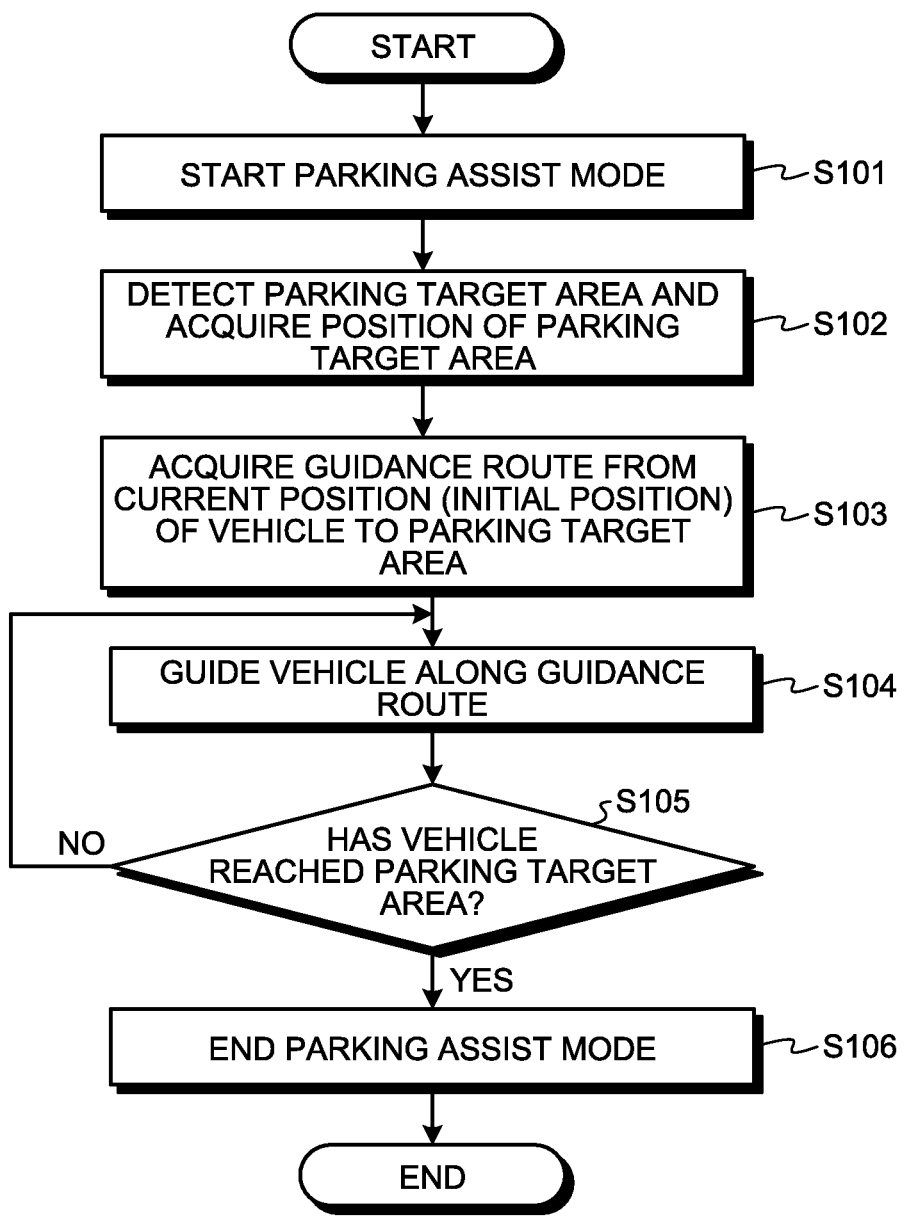
FIG. 8 is a flowchart for explaining the outline of an operation of the ECU as the parking assist apparatus of the first embodiment.

FIG. 8 is a flowchart for explaining the outline of the operation of the ECU 14 as the parking assist apparatus of the first embodiment.

When the parking assist mode is started (S101), the position acquisition unit 141 detects the parking target area 301 and acquires the position of the parking target area 301 (S102). Then, the route acquisition unit 142 acquires the guidance route from the current position (the initial position 101) of the vehicle 1 to the parking target area 301 (the parking target position 104) (S103).

Figure 9:
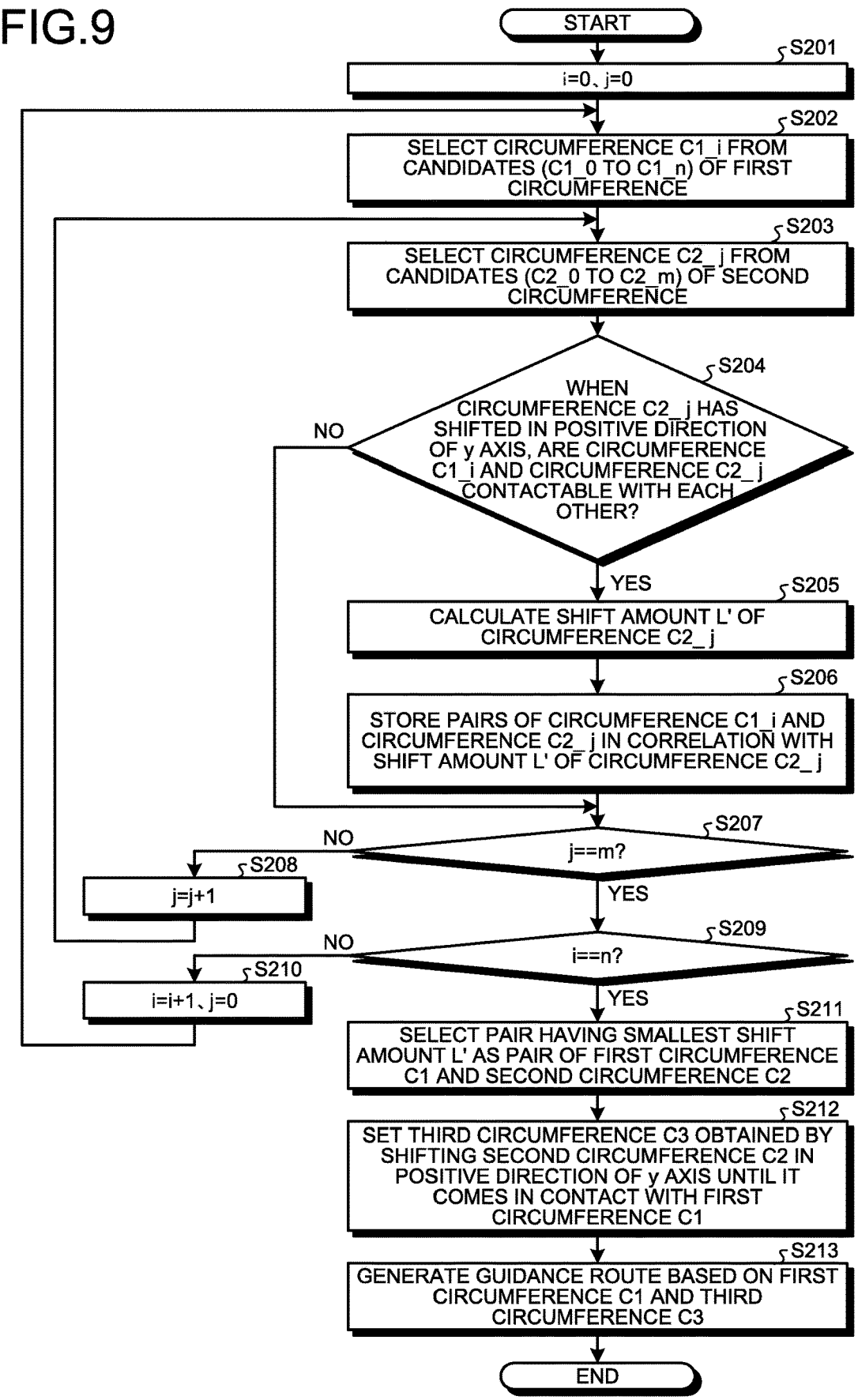
FIG. 9 is a flowchart for explaining a process S103 in which the ECU as the parking assist apparatus of the first embodiment acquires a guidance route.

FIG. 9 is a flowchart for explaining the process S103 in which the ECU 14 as the parking assist apparatus of the first embodiment acquires the guidance route.

The route acquisition unit 142 sets loop indexes i and j, which are used in the subsequent loop process, to 0 (S201). Each of the loop indexes i and j can take a natural number of 0 or more.

Subsequently, the route acquisition unit 142 selects one circumference $C1\_i$ from candidates $C1\_0$ to $C1\_n$ of the first circumference C1 (S202), and selects one circumference $C2\_j$ from candidates $C2\_0$ to $C2\_m$ of the second circumference C2 (S203). It is noted that n and m are natural numbers of 2 or more, respectively. According to the example of FIG. 7, n corresponds to 4 and m corresponds to 3.

Subsequently, when the circumference $C2\_j$ is shifted in the positive direction of the y axis, the route acquisition unit 142 determines whether the circumference $C1\_i$ and the circumference $C2\_j$ are contactable with each other (S204). The method for determining whether the circumference $C1\_i$ and the circumference $C2\_j$ are contactable with each other is not limited to a specific method. An example of the method for determining whether the circumference $C1\_i$ and the circumference $C2\_j$ are contactable with each other will be described below.

Figure 10:
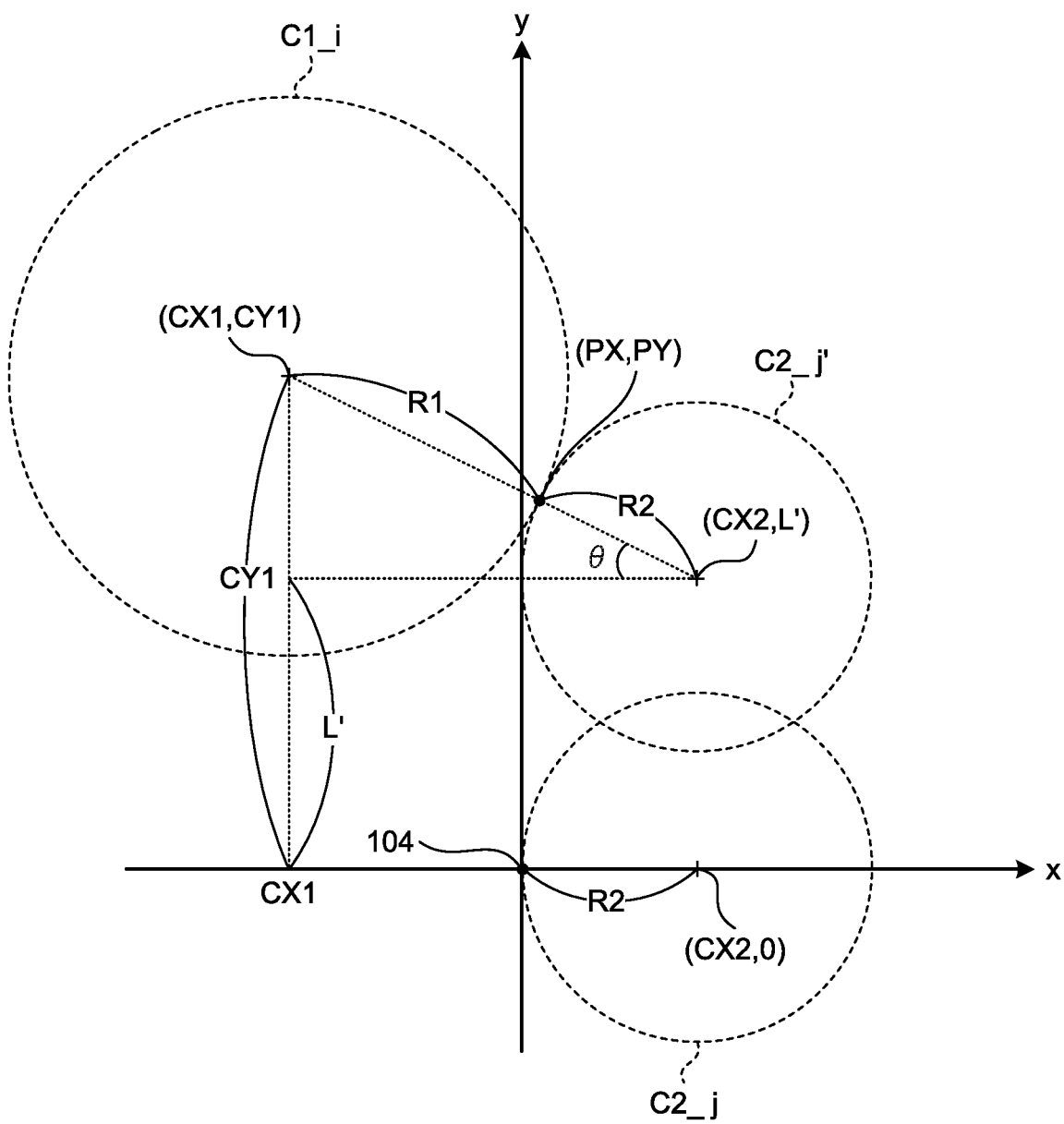
FIG. 10 is a view for explaining an example of a method in which the ECU as the parking assist apparatus of the first embodiment determines whether a circumference C1_i and a circumference C2_j are contactable with each other.

As illustrated in FIG. 10, when the coordinates of the center of the circumference $C1\_i$ are denoted as (CX1,CY1), the radius of the circumference $C1\_i$ is denoted as R1, the coordinates of the center of the circumference $C2\_j$ are denoted as (CX2,0), the radius of the circumference $C2\_j$ is denoted as R2, and the shift amount of the circumference $C2\_j$ is denoted as L', the coordinates of the center of the shifted circumference $C2\_j$ (denoted as circumference $C2\_j'$) correspond to (CX2,L'). It is noted that CX2 is equal to R2.

The circumference $C2\_j$ is in contact with the y axis. Thus, when a value CX1+R1 obtained by adding the radius R1 to the x coordinate value CX1 of the center of the circumference $C1\_i$ is equal to or more than 0, the circumference $C2\_j$ contacts with the circumference $C1\_i$ after shifting to any position. Therefore, when the value CX1+R1 is equal to or more than 0, the route acquisition unit 142 determines that the circumference $C1\_i$ and the circumference $C2\_j$ are contactable with each other, and when the value CX1+R1 is smaller than 0, the route acquisition unit 142 determines that the circumference $C1\_i$ and the circumference $C2\_j$ are not contactable with each other.

In another example, when a distance CX2−CX1 between the x coordinates of the centers of both circumferences is equal to or less than the total value R1+R2 of the radii of both circumferences, the route acquisition unit 142 determines that the circumference $C1\_i$ and the circumference $C2\_j$ are contactable with each other. On the other hand, when the distance CX2−CX1 exceeds the value R1+R2, the route acquisition unit 142 determines that the circumference $C1\_i$ and the circumference $C2\_j$ are not contactable with each other.

When it is determined that the circumference $C1\_i$ and the circumference $C2\_j$ are contactable with each other (Yes at S204), the route acquisition unit 142 calculates the shift amount L' of the circumference $C2\_j$ (S205).

As illustrated in FIG. 10, when an angle between a straight line connecting the center of the circumference $C1\_i$ and the center of the circumference $C2\_j$ and a straight line parallel to the x axis is denoted as θ, the following Equation (1) and Equation (2) are established.

$$\cos(\theta) = (CX2 - CX1)/(R1 + R2) \quad (1)$$

$$CY1 - L' = (R1 + R2) * \sin(\theta) \quad (2)$$

The following Equation (3) is derived by modifying Equation (1) and Equation (2) above.

$$L' = CY1 - (R1 + R2) * \sin(\arccos((CX2 - CX1)/(R1 + R2))) \quad (3)$$

The route acquisition unit 142 can calculate the shift amount L' of the circumference C2_j by using Equation (3) above in the process of S205. Equation (3) above is an example of an algorithm for calculating the shift amount L'.

The coordinates (PX,PY) of the contact point between the circumference C1_i and the circumference C2_j can be derived by the following Equation (4) and Equation (5).

$$PX = CX2 - R2 * (CX2 - CX1)/(R1 + R2) \quad (4)$$

$$PY = L' + R2 * \sin(\arccos((CX2 - CX1)/(R1 + R2))) \quad (5)$$

Subsequent to the process of S205, the route acquisition unit 142 stores the pairs of the circumference C1_i and the circumference C2_j in, for example, the RAM 14c and the like in correlation with the shift amount L' (S206).

When it is determined in the determination process of S204 that the circumference C1_i and the circumference C2_j are not contactable with each other (No at S204), the route acquisition unit 142 skips the subsequent processes of S205 and S206.

After determining No in the determination process of S204 or the process of S206, the route acquisition unit 142 determines whether the loop index j is equal to m (S207). When it is determined that the loop index j is not equal to m (No at S207), the route acquisition unit 142 increments the loop index j by 1 (S208) and the control proceeds to S203.

When it is determined that the loop index j is equal to m (Yes at S207), the route acquisition unit 142 determines whether the loop index i is equal to n (S209). When it is determined that the loop index i is not equal to n (No at S209), the route acquisition unit 142 increments the loop index i by 1 and resets the loop index j to 0 (S210) and the control proceeds to S202.

As described above, by the processes of S201 to S210, the route acquisition unit 142 can extract a combination, in which the circumference C1_i and the circumference C2_j are contactable with each other by shifting the circumference C2_j in the positive direction of the y axis, from combinations including one of the candidates C1_0 to C1_n of the first circumference and one of the candidates C2_0 to C2_m of the second circumference.

When it is determined that the loop index i is equal to n (Yes at S209), the route acquisition unit 142 selects a pair having the smallest shift amount L' among the stored pairs of the circumference C1_i and the circumference C2_j as the pair of the first circumference C1 and the second circumference C2 (S211). That is, the route acquisition unit 142 sets the circumference C1_i constituting the pair having the smallest shift amount L' as the first circumference C1, and sets the circumference C2_j constituting the pair having the smallest shift amount L' as the second circumference C2.

When it is not possible to extract the combination in which the circumference C1_i and the circumference C2_j are contactable with each other by shifting the circumference C2_j in the positive direction of the y axis, that is, when all the pairs of the circumference C1_i and the circumference C2_j are not stored at the time point at which Yes is determined in S209, the ECU 14 may determine that it is not possible to continue the parking assist mode and end the parking assist mode.

Subsequent to the process of S211, the route acquisition unit 142 sets the third circumference C3 obtained by shifting the second circumference C2 in the positive direction of the y axis until it comes in contact with the first circumference C1 (S212). Then, on the basis of the first circumference C1 and the third circumference C3, the route acquisition unit 142 generates the guidance route 110 (S213).

The route acquisition unit 142 can calculate the coordinates of the position 105, which is the contact point between the first circumference C1 and the third circumference C3, by calculation similar to Equation (4) and Equation (5) above. The contact point between the third circumference C3 and the second straight line 103 is (0, L). In the process of S213, the route acquisition unit 142 generates the guidance route 110 that causes the vehicle 1 to move forward from the initial position 101 to the position 105 along the first circumference C1, move 1 backward from the position 105 to the position 106, which is the contact point between the third circumference C3 and the y axis, along the third circumference C3, and move backward from the position 106 to the parking target position 104 along the y axis.

By the process of S213, the process S103 for acquiring the guidance route 110 is completed.

Returning back to FIG. 8, after the process S103 for acquiring the guidance route, the guidance control unit 143 guides the vehicle 1 along the guidance route 110 (S104). For example, the guidance control unit 143 determines a steering angle on the basis of a comparison between the current position of the vehicle 1 acquired by the position acquisition unit 141 and the guidance route 110, and notifies the actuator 13a of the determined steering angle. As described above, this is an example of a guidance method. The guidance control unit 143 may guide the vehicle 1 by notifying the driver of a traveling direction and the like, or may automatically perform acceleration/deceleration or switching of the range as well as the automatic steering.

Subsequent to the process of S104, the guidance control unit 143 determines whether the vehicle 1 has reached the parking target area 301, that is, the parking target position 104 that is an end point of the guidance route 110 (S105). When it is determined by the guidance control unit 143 that the vehicle 1 has not reached the parking target area 301 (No at S105), the process of S104 is continued. When it is determined by the guidance control unit 143 that the vehicle 1 has reached the parking target area 301 (Yes at S105), the ECU 14 ends the parking assist mode (S106) and completes the operation.

As described above, according to the first embodiment, the route acquisition unit 142 sets the first circumference C1 that is in contact with the first straight line 102 extending in the traveling direction of the vehicle 1 and that passes through the position (the initial position 101) of the vehicle 1. Furthermore, the route acquisition unit 142 sets the second circumference C2 that is in contact with the second straight line 103 extending in the exit direction from the parking target area 301 and that passes through the parking target area 301. Then, the route acquisition unit 142 sets the third circumference C3 obtained by shifting the second circumference C2 along the second straight line 103 until it comes in contact with the first circumference C1. Then, the route acquisition unit 142 acquires the guidance route 110 including part of the first circumference C1 as a route for moving the vehicle 1 forward and including part of the third circumference C3 as a route for moving the vehicle 1 backward.

Therefore, the guidance route 110 is determined only by setting the first circumference C1 and the second circumference C2, so that the calculation cost required for acquiring the guidance route 110 is suppressed.

Furthermore, the route acquisition unit 142 extracts a combination, in which the circumference $C1\_i$ and the circumference $C2\_j$ are contactable with each other by the shift of the circumference $C2\_j$ along the second straight line 103, from a plurality of combinations including the circumference $C1\_i$, which is one of the candidates $C1\_0$ to $C1\_n$ of the first circumference, the circumference $C2\_j$, which is one of the candidates $C2\_0$ to $C2\_m$ of the second circumference, wherein the candidates $C1\_0$ to $C1\_n$ are in contact with the first straight line 102, pass through the position (the initial position 101) of the vehicle 1, and have different radii and the candidates $C2\_0$ to $C2\_m$ are in contact with the second straight line 103, pass through the parking target area 301, and have different radii. Then, the route acquisition unit 142 sets the circumference $C1\_i$ constituting the extracted combination as the first circumference C1 and sets the circumference $C2\_j$ constituting the extracted combination as the second circumference C2.

Therefore, the route acquisition unit 142 can determine the first circumference C1 and the second circumference C2 only by examining maximum $(n+1)*(m+1)$ combinations, so that the calculation cost required for acquiring the guidance route 110 is suppressed.

Furthermore, when a plurality of combinations, in which the circumference $C1\_i$ and the circumference $C2\_j$ are contactable with each other by the shift of the circumference $C2\_j$ along the second straight line 103, are extracted, the route acquisition unit 142 selects a combination in which the shift amount L' of the circumference $C2\_j$ is minimum.

As the shift amount L' of the circumference $C2\_j$ is smaller, a maximum reach position in the positive direction of the y axis component tends to be smaller. Thus, when an obstacle (for example, a structure or another parked vehicle) exists at a position facing the parking target area 301 by selecting the combination in which the shift amount L' of the circumference $C2\_j$ is minimum, it is possible to reduce a risk that the vehicle 1 collides with the obstacle.

When the combinations, in which the circumference $C1\_i$ and the circumference $C2\_j$ are contactable with each other by the shift of the circumference $C2\_j$ along the second straight line 103, are extracted, the route acquisition unit 142 may select a combination in which the shift amount L' of the circumference $C2\_j$ is maximum. By selecting the combination in which the shift amount L' of the circumference $C2\_j$ is maximum, it is possible to increase a distance that the vehicle 1 moves backward right behind in the guidance route 110. Thus, when an obstacle (for example, a structure or another parked vehicle) exists at a position adjacent to the parking target area 301, it is possible to reduce a risk of involving the obstacle at the time of retreat.

Furthermore, when Yes is initially determined in the determination process of S204, that is, when the combination, in which the circumference $C1\_i$ and the circumference $C2\_j$ are contactable with each other, is initially extracted, the route acquisition unit 142 may select the initially extracted combination as a combination of the first circumference C1 and the second circumference C2 without performing the loop process of S202 to S210. That is, the route acquisition unit 142 sequentially determines whether the combination of the circumference $C1\_i$ and the circumference $C2\_j$ corresponds to a combination, in which the circumference $C1\_i$ and the circumference $C2\_j$ are contactable with each other by the shift of the circumference $C2\_j$, and selects the initially determined combination of the circumference $C1\_i$ and the circumference $C2\_j$ when the combination of the circumference $C1\_i$ and the circumference $C2\_j$ corresponds to the combination in which the circumference $C1\_i$ and the circumference $C2\_j$ are contactable with each other by the shift of the circumference $C2\_j$.

Therefore, when the combination in which the circumference $C1\_i$ and the circumference $C2\_j$ are contactable with each other is extracted, it is possible to determine the first circumference C1 and the second circumference C2 without examining all the $(n+1)*(m+1)$ combinations, so that the calculation cost required for acquiring the guidance route 110 is suppressed.

As described above, according to the first embodiment, the calculation cost required for acquiring the guidance route 110 is suppressed. Since the calculation time (processing load) required for acquiring the guidance route 110 is reduced, the influence of the processing related to the parking assist in the ECU 14 on processing other than the parking assist (for example, the control of the steering system 13 or the brake system 18, the image processing related to the image displayed on the display screen 8, and the like) is suppressed. Thus, the ECU 14 can smoothly perform the processing other than the parking assist as well as the processing related to the parking assist.

Second Embodiment

When a driver senses a danger that the vehicle 1 collides with an obstacle (a pedestrian, another vehicle, a structure, and the like) during the guidance of the vehicle 1, the driver may, in some cases, manually change the range of the gear shift operation unit 7 or manually steer the vehicle 1 in a direction different from the direction along the guidance route 110. When the position of the vehicle 1 deviates from the guidance route 110 by such an operation, the ECU 14 may reacquire the guidance route 110.

Figure 11:
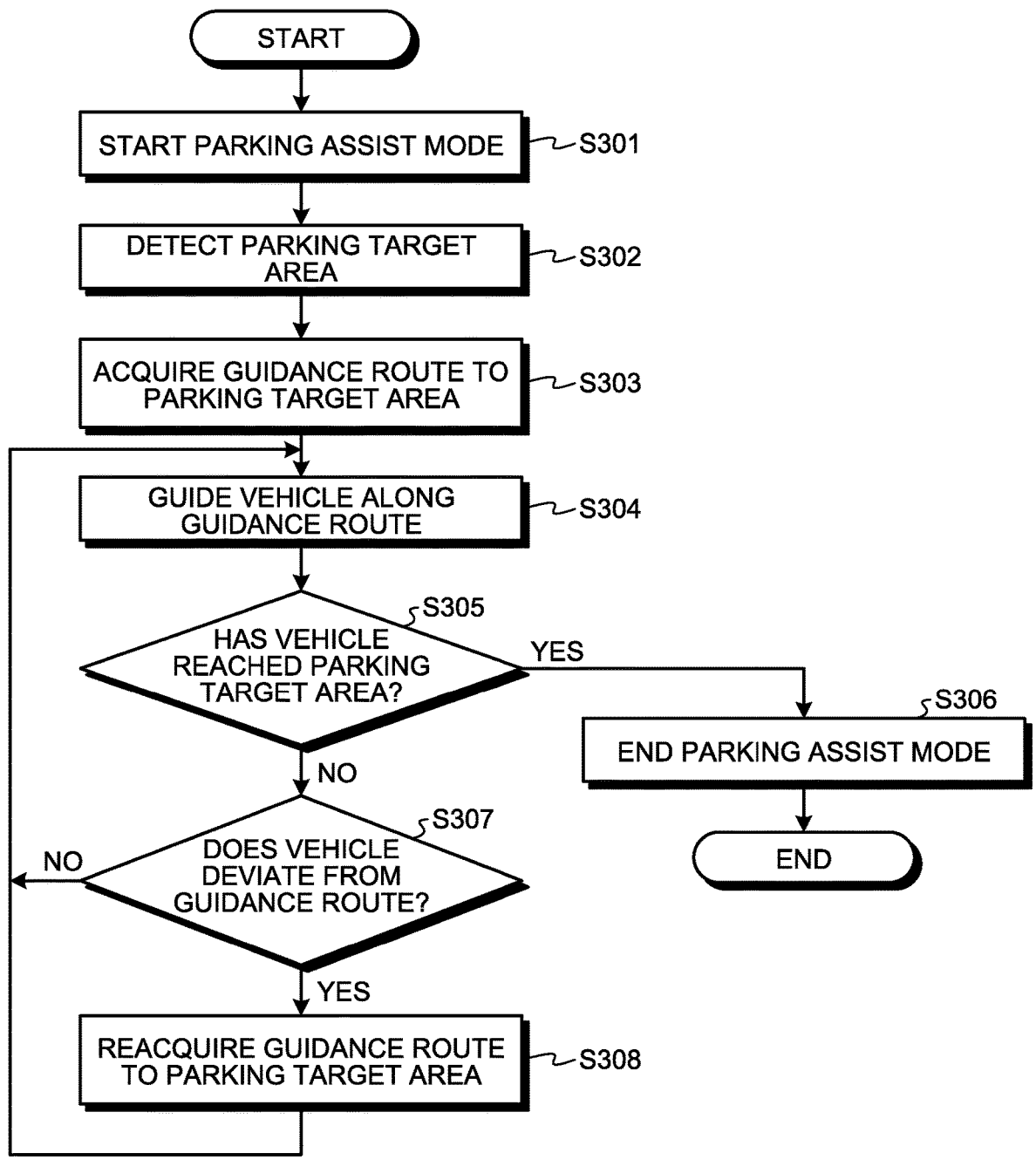
FIG. 11 is a flowchart for explaining the outline of an operation of an ECU as a parking assist apparatus of a second embodiment.

FIG. 11 is a flowchart for explaining the outline of an operation of the ECU 14 as a parking assist apparatus of a second embodiment.

In S301 to S303, processes similar to those of S101 to S103 are performed. Particularly, in S303, the guidance route 110 is acquired.

In relation to the process of S303, as an algorithm for acquiring the guidance route 110, an algorithm similar to that of the first embodiment may not be employed. An existing arbitrary algorithm or an arbitrary algorithm to be developed hereafter may be employed as the algorithm for acquiring the guidance route 110 in S303.

Subsequent to the process of S303, the guidance control unit 143 guides the vehicle 1 along the guidance route 110 (S304). Similarly to the first embodiment, the guidance method is not limited to a specific method.

The guidance control unit 143 determines whether the vehicle 1 has reached the parking target area 301, that is, the parking target position 104 that is the end point of the guidance route 110 (S305). When it is determined by the guidance control unit 143 that the vehicle 1 has reached the parking target area 301 (Yes at S305), the ECU 14 ends the parking assist mode (S306) and completes the operation.

When it is determined that the vehicle 1 has not reached the parking target area 301 (No at S305), the guidance control unit 143 determines whether the vehicle 1 deviates from the guidance route 110 (S307).

The method for determining whether the vehicle 1 deviates from the guidance route 110 is not limited to a specific method. In one example, when the shift sensor 15 detects an operation of changing the range of the gear shift operation unit 7 from a drive range to a reverse range before the vehicle 1 reaches the turnabout position (the position 105 in FIGS. 5 and 6), the guidance control unit 143 determines that the vehicle 1 deviates from the guidance route 110. In another example, when the steering angle sensor 16 detects an operation of steering the vehicle 1 in a direction different from the direction along the guidance route 110 by a predetermined angle or more, the guidance control unit 143 determines that the vehicle 1 deviates from the guidance route 110. In further another example, when the current position of the vehicle 1 acquired by the position acquisition unit 141 and the guidance route 110 are compared with each other and the current position of the vehicle 1 and the guidance route 110 are spaced from each other by a predetermined distance or more, the guidance control unit 143 determines that the vehicle 1 deviates from the guidance route 110.

When it is determined by the guidance control unit 143 that the vehicle 1 deviates from the guidance route 110 (Yes at S307), the route acquisition unit 142 reacquires the guidance route 110 according to the procedure illustrated in FIG. 9 (S308). Then, the control proceeds to S304. When it is not determined by the guidance control unit 143 that the vehicle 1 deviates from the guidance route 110 (No at S307), the process of S308 is skipped.

As described above, the acquisition algorithm of the guidance route 110 described in the first embodiment has a low calculation cost. Thus, when the acquisition algorithm is employed in order to reacquire the guidance route 110 as described in the aforementioned second embodiment, it is possible to quickly reacquire the guidance route 110.

So far, although the embodiments of the present invention have been exemplified, the aforementioned embodiments and modification examples are merely examples and are not intended to limit the scope of the invention. The aforementioned embodiments and modification examples can be embodied in a variety of other forms and various omissions, substitutions, combinations, and modifications can be made without departing from the spirit of the invention. Furthermore, the configuration and shape of each embodiment and each modification example can also be partially exchanged for implementation.

What is claimed is:

1. A parking assist apparatus comprising:
a memory; and
a hardware processor coupled to the memory, the hardware processor being configured to:
set a first circumference having a predetermined first radius that is in tangential contact with a first straight line extending in a traveling direction of a vehicle and that passes through a center position of the vehicle in a width direction of the vehicle;
set a second circumference having a predetermined second radius that is in tangential contact with a second straight line extending in an exit direction from a parking target area of the vehicle and that passes through a center of the parking target area in a width direction of the parking target area;
set a third circumference obtained by shifting the second circumference along the second straight line until the second circumference comes in contact with the first circumference;
acquire a guidance route that includes part of the first circumference as a route for moving the vehicle forward and includes part of the third circumference as a route for moving the vehicle backward;
display the guidance route on a display; or
autonomously guide the vehicle along the acquired guidance route by controlling steering of the vehicle along the guidance route.

2. The parking assist apparatus according to claim 1, wherein the hardware processor
extracts, from among a plurality of first combinations of a fifth circumference and a seventh circumference, a second combination in which the fifth circumference and the seventh circumference are contactable with each other by shift of the seventh circumference along the second straight line,
the fifth circumference being one of a plurality of fourth circumferences each being in contact with the first straight line, each passing through the center position of the vehicle, and each having different radii,
the seventh circumference being one of a plurality of sixth circumferences each being in contact with the second straight line, each passing through the parking target area, and each having different radii,
sets the fifth circumference constituting the second combination as the first circumference, and
sets the seventh circumference constituting the second combination as the second circumference.

3. The parking assist apparatus according to claim 2, wherein, when a plurality of second combinations are extracted, the hardware processor selects, from the extracted second combinations, the second combination in which a shift amount of the seventh circumference is minimum.

4. The parking assist apparatus according to claim 2, wherein, when a plurality of second combinations are extracted, the hardware processor selects, from the extracted second combinations, the second combination in which a shift amount of the seventh circumference is maximum.

5. The parking assist apparatus according to claim 2, wherein the hardware processor determines sequentially whether each of the plurality of first combinations corresponds to the second combination and selects a first combination that is initially determined to correspond to the second combination.

6. A parking assist apparatus comprising:
a memory; and
a hardware processor coupled to the memory, the hardware processor being configured to:
set a first circumference having a predetermined first radius that is in tangential contact with a first straight line extending in a traveling direction of a vehicle and that passes through a center position of the vehicle in a width direction of the vehicle;
set a second circumference having a predetermined second radius that is in tangential contact with a second straight line extending in an exit direction from a parking target area of the vehicle and that passes through a center of the parking target area in a width direction of the parking target area;

set a third circumference obtained by shifting the second circumference along the second straight line until the second circumference comes in contact with the first circumference;

acquire a guidance route that includes part of the first circumference as a route for moving the vehicle forward and includes part of the third circumference as a route for moving the vehicle backward;

notify a driver of the acquired guidance route; or autonomously guide the vehicle along the acquired guidance route by controlling steering of the vehicle along the guidance route.

7. The parking assist apparatus according to claim 6, wherein the hardware processor extracts, from among a plurality of first combinations of a fifth circumference and a seventh circumference, a second combination in which the fifth circumference and the seventh circumference are contactable with each other by shift of the seventh circumference along the second straight line, the fifth circumference being one of a plurality of fourth circumferences each being in contact with the first straight line, each passing through the center position of the vehicle, and each having different radii, the seventh circumference being one of a plurality of sixth circumferences each being in contact with the second straight line, each passing through the parking target area, and each having different radii, sets the fifth circumference constituting the second combination as the first circumference, and sets the seventh circumference constituting the second combination as the second circumference.

8. The parking assist apparatus according to claim 7, wherein, when a plurality of second combinations are extracted, the hardware processor selects, from the extracted second combinations, the second combination in which a shift amount of the seventh circumference is minimum.

9. The parking assist apparatus according to claim 7, wherein, when a plurality of second combinations are extracted, the hardware processor selects, from the extracted second combinations, the second combination in which a shift amount of the seventh circumference is maximum.

10. The parking assist apparatus according to claim 7, wherein the hardware processor determines sequentially whether each of the plurality of first combinations corresponds to the second combination and selects a first combination that is initially determined to correspond to the second combination.

* * * * *